Patented Dec. 5, 1922.

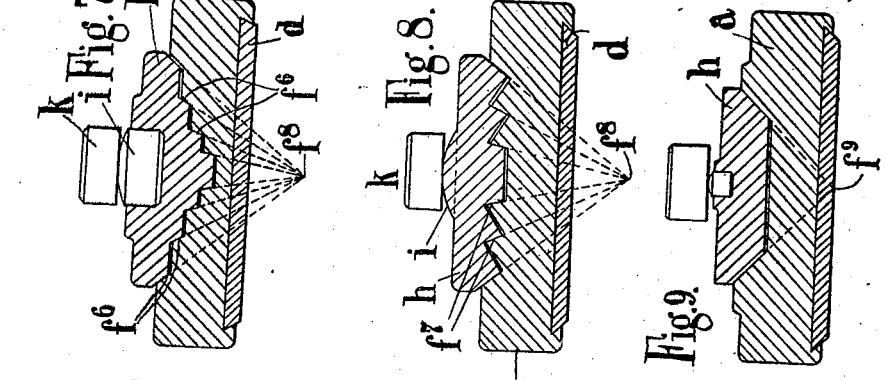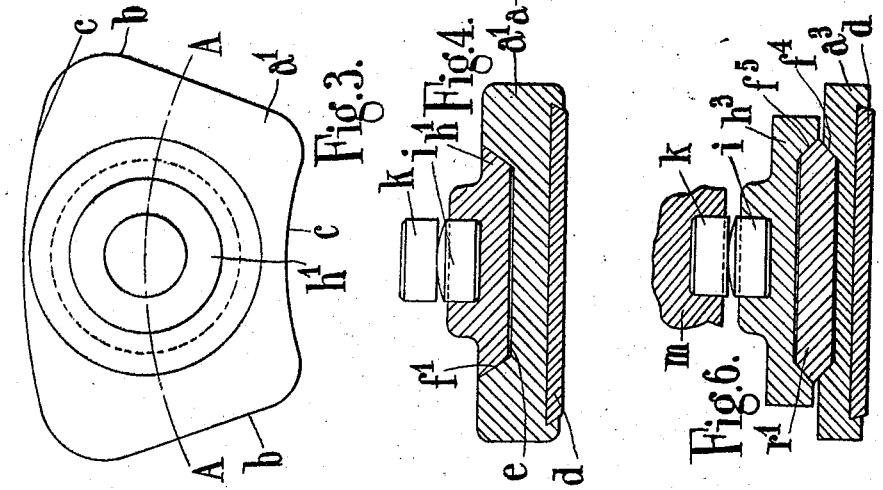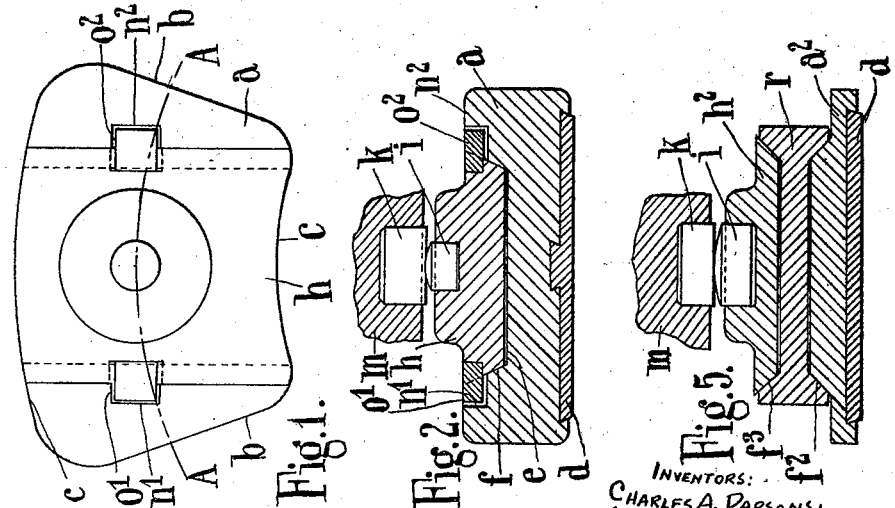

1,438,053

UNITED STATES PATENT OFFICE.

CHARLES ALGERNON PARSONS AND STANLEY SMITH COOK, OF NEWCASTLE-UPON-TYNE, ENGLAND; SAID COOK ASSIGNOR TO SAID PARSONS.

BEARING.

Application filed August 26, 1921. Serial No. 495,518.

*To all whom it may concern:*

Be it known that we, CHARLES ALGERNON PARSONS and STANLEY SMITH COOK, both subjects of the King of Great Britain and Ireland, and both residing at Heaton Works, Newcastle-upon-Tyne, in the county of Northumberland, England, have invented certain new and useful Improvements in and Relating to Bearings, of which the following is a specification.

The present invention relates to bearings and particularly, though not exclusively, to those of the type having a number of pads so mounted that they can tilt slightly and so permit a film of lubricant to be automatically maintained.

In such bearings difficulties arise owing to unequal expansion of the different parts lessening or actually obliterating the clearances, this difficulty being met with particularly in cases where one pad of a number co-acting with the same collar obtains for any reason an undue share of the load, and a main object of the present invention is to overcome this difficulty.

To this end the invention consists in a compensating bearing comprising essentially a member having a socket or equivalent defined by outwardly diverging surfaces and a second member with correspondingly converging surfaces to form a plug or equivalent fitting into the socket, differential expansion of such cooperating members acting to cause the plug member to enter to varying depths into the socket member.

The invention further consists in a compensating bearing pad formed of elements having different coefficients of expansion, the element having the greater coefficient being formed as a socket with inclined sides and the element with the lesser coefficient being correspondingly formed to pass a certain distance into the socket.

The invention finally consists in the improved bearings or details thereof hereinafter described or indicated.

Referring to the accompanying drawings:—

Figure 1 shows a plan of one form of the invention in which the plug and socket members are in contact over areas forming parts of the surface of a wedge, Figure 2 being a corresponding section on the line A—A of Figure 1, i. e., a line struck from the centre of rotation of the shaft or the like;

Figures 3 and 4 correspond respectively to Figures 1 and 2 and show a modification of the invention in which the co-acting surfaces are conical;

The remaining figures are all sections similar to those of Figures 2 and 4 of other modifications of the invention; of these Figure 5 shows a two-faced socket with a plug on each side;

Figure 6 on the contrary shows a two-faced plug with a socket each side;

Figure 7 shows a series of conical or wedge surfaces in stepped formation;

Figure 8 shows a series of conical or wedge bearing surface lying, so to say, in one plane; while finally Figure 9 shows a modification in which the plug is constructed of invar steel.

Where desirable, corresponding parts in the different figures are represented by the same reference letter.

In carrying the invention into effect as applied to a thrust block having pivoted pads, (see Figures 1 and 2) each pad may consist of a body, $a$, of the usual sector shape bounded for example by radial lines, $b$, and circular arcs, $c$, and faced on one side with white metal, $d$, to form the rubbing surface. The body of the pad so formed is provided at the back with a broad socket, $e$, having an outwardly bevelled edge, $f$, and into this socket but for less than its full depth fits a corresponding plug, $h$, forming a holder for the pivot pin, $i$, the edges of the plug itself being bevelled to correspond with the bevels of the socket. The pin, $i$, bears against a hardened steel plug, $k$, inserted in an appropriate part, $m$, of the thrust block in the usual manner, while the bevelled surfaces which take the thrust form part of a wedge and run right across the pad from one side to the other. To maintain the socket member, $e$, and plug member, $h$, in correct relation, the former is provided with recesses $n^1$, $n^2$, into which fit lugs, $o^1$, $o^2$, which may be dove-tailed into the plug.

The socket itself may conveniently be made of gun-metal and the pivot-pin holder of steel, the dimensions and coefficients of expansion of the two parts being so chosen as to bring about the following compensating action:

On a rise of temperature occurring, the gun-metal will expand more than the steel, thereby enlarging the socket and allowing the steel pivot-pin holder or wedge-like member to sink further into the gun-metal socket thereby reducing, or at any rate not increasing, the overall dimensions of the pad, that is, the thickness of the pad from the working face to the actual pivot point.

The modification shown in Figures 3 and 4 is in general similar to that above described but the plug member, $h^1$, is circular and bears on the socket member, $a^1$, over the conical surface, $f^1$.

In the modification shown in Figure 5, the body of the pad, $a^2$, faced as before with white metal, $d$, and also the pivot-pin holder, $h^2$, may be formed of steel, the body of any suitable contour, circular or rectilinear, or otherwise, being provided with a protuberance or plug portion as shown with bevelled edges, $f^2$, and the pivot holder having corresponding edges, $f^3$, bevelled in a similar but reversely disposed manner. Between these two steel parts a two-faced intermediate member, $r$, of gun-metal is arranged provided on each of its opposite faces with a socket having its edges bevelled to correspond with the bevels of the plug members, $a^2$ and $h^2$, above mentioned. In this construction on heating of the parts the gun-metal socket piece, $r$, will expand more than the steel plug members, each of which will thus sink further into its appropriate socket.

The arrangement last described is reversed in the form shown in Figure 6, that is to say, the body, $a^3$, faced with white metal is made of gun-metal as is also the pivot-pin holder, $h^3$, these two members being respectively provided with sockets of convenient shape having bevelled edges, $f^4$, $f^5$, as before, and into these sockets fits a two-faced disc, $r^1$, or other appropriately shaped steel intermediate piece oppositely bevelled so as to correspond with the sockets of the gun-metal elements.

In the examples of the invention above described, each element of the pad, whether plug or socket, co-acts with a neighbour through only the minimum number of bevelled surfaces necessary for support but in some cases each such surface may be replaced by a series of such surfaces, $f^6$, arranged in step formation as in Figure 7, or by similar surfaces, $f^7$, arranged more or less in the same plane as in Figure 8. As indicated by the dotted lines in Figures 7 and 8, such surfaces whether cone or wedge have a common apex or equivalent, $f^8$, lying on that side of the working surface remote from the pivot pin and at a distance therefrom depending on the relation between the coefficients of expansion of the plug and socket materials.

In Figure 9 an example is shown in which the plug member, $h$, is made of a material such as invar steel having a negligibly small coefficient of thermal expansion in which case the apex or equivalent, $f^9$, of the cone or wedge lies on the working surface.

In addition the components of the pad, instead of being made of metals having different rates of thermal expansion as described above, may be made of the same metals or of different metals having the same rate of thermal expansion, unequal heating of the parts in such modified constructions being relied on to provide the differential expansion necessary for compensation.

Claims:

1. A compensating thrust-bearing comprising essentially a member having a socket or equivalent defined by outwardly diverging surfaces and a second member with correspondingly converging surfaces to form a plug or equivalent fitting into the socket, said members being differentially expansible thereby acting to cause the plug member to enter to varying depths into the socket member, substantially as and for the purpose described.

2. A compensating thrust-bearing pad formed of elements having different coefficients of expansion, the element having the greater coefficient being formed as a socket member with inclined sides and the element with the lesser coefficient being correspondingly formed as a plug member to pass a certain distance into the socket, substantially as and for the purpose described.

3. A form of the pad claimed in claim 2, in which one of said members has a plurality of contact faces, substantially as and for the purpose described.

4. A device of the character described including a compensating load carrying element mounted upon a support, said element and support being of materials having different coefficients of expansion, said element having a plurality of surfaces converging to a common apex.

5. A compensating thrust bearing including a member having a socket therein, and a plug member fitting into said socket, said members being differentially expansible thereby acting to cause the plug member to enter to varying depths into the socket member, substantially as described.

6. A device of the character described including a compensating load carrying element mounted upon a support, said element and support being of materials having different coefficients of expansion, said element having tapered sides fitting a corresponding tapered recess in its support.

7. A device of the character described including a compensating load carrying element mounted upon a support, said element and support being of materials having different coefficients of expansion, said element having a portion of its support engaging face, part of a conical surface.

8. A device of the character described including a compensating load carrying element mounted upon a support, said element and support being of materials having different coefficients of expansion, said load carrying element having a plurality of contact faces, each face being a portion of the surface of an imaginary cone, all of said imaginary cones having a common axis.

9. A device of the character described, including a compensating load carrying element mounted upon a support, said members being differentially expansible, said load carrying element having a plurality of bearing faces engaging said support.

10. A device of the character described, including a stepped compensating load carrying element, and a support therefor, said load carrying element and support being differentially expansible.

11. A device of the character described, including a compensating load carrying element, a support therefor, said element being seated in a depression in said support, said load carrying element having surfaces in and out of contact with said support within said depression said load carrying element and support being differentially expansible.

12. The device of claim 11, said out of contact surfaces being parallel.

In testimony whereof we have signed our names to this specification.

CHARLES ALGERNON PARSONS.
STANLEY SMITH COOK.